Jan. 20, 1970 I. P. MITYASHIN ET AL 3,491,229

DIGITAL-ANALOG CONVERTER WITH PNEUMATIC OUTPUT

Filed April 2, 1968

United States Patent Office 3,491,229

Patented Jan. 20, 1970

3,491,229

DIGITAL-ANALOG CONVERTER WITH PNEUMATIC OUTPUT

Igor Petrovich Mityashin, Prospekt Gagarina 3, kv. 22; and Arkady Shaevich Katsnelson, Ulitsa Kirova 26, kv. 17, both of Smolensk, U.S.S.R.; and Jury Iosifovich Ostrovsky, Oblast, Poselok Nemchinonka, Sovetsky prospekt 11, Moskovskaya oblast, U.S.S.R.

Filed Apr. 2, 1968, Ser. No. 718,172

Int. Cl. G06d *1/00;* G06m *1/12*

U.S. Cl. 235—201 4 Claims

ABSTRACT OF THE DISCLOSURE

A digital to analog converter having a pneumatic output. The converter includes a lever supported by a pivot dividing the lever into two arms. An indicator is provided which includes a nozzle and a shutter, one of which is mounted on one of the arms of the lever. A pneumatic amplifier is connected to the nozzle. The lever and pneumatic amplifier are connected in feedback relationship, the amplifier having a pneumatic output constituting the output of the converter. Weights are linearly distributed along said one arm for obtaining moments thereon according to the application of the weights to the arms selectively according to a parallel binary code. Individual drives are provided which respectively position the weights on the arm according to an input signal in a parallel binary code. Displacement of the shutter relative to the nozzle indicates the deviation of the lever from equilibrium and constitutes a measure of the input signal. The feed-back system restores the lever to equilibrium, there being provided a bellows coupled to the amplifier and to the other of the arms of the lever.

Figures 1, 2:
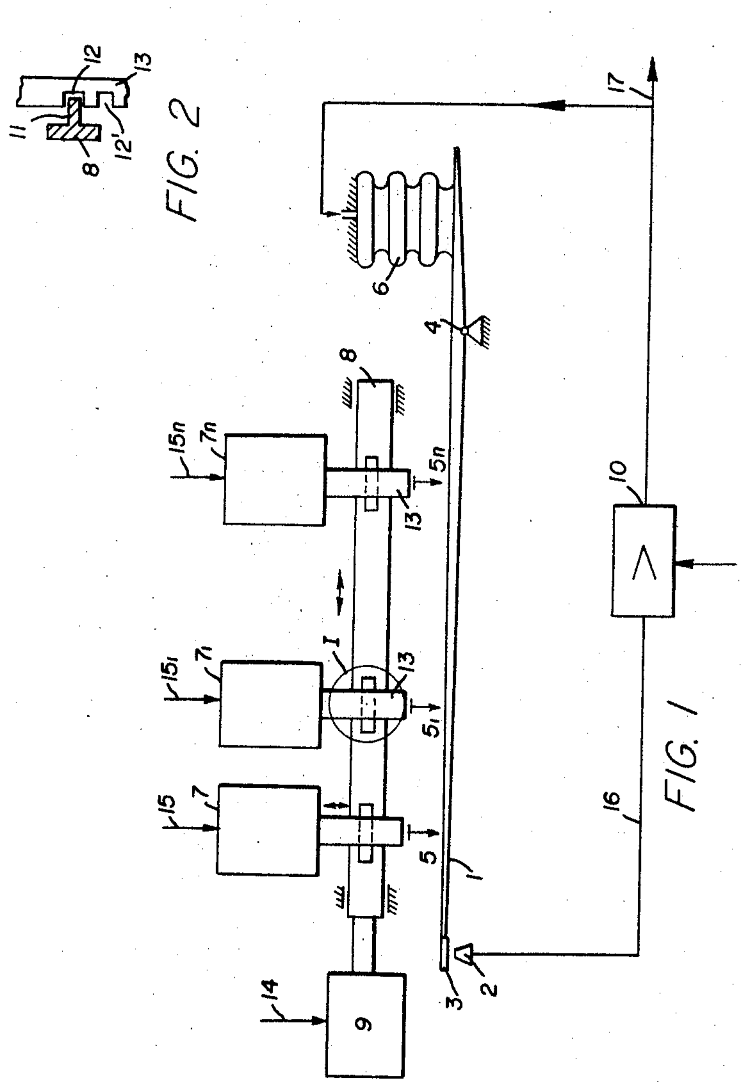

This invention relates to instruments for the monitoring and control of processes, and, more specifically, to those used in automatic process control systems incorporating digital control computers, these instruments being designed to convert the control signal obtained in a digital form at the output of a control computer to an analog pneumatic signal which can be used for controlling either the settings of pneumatic regulators or directly the final control elements.

A conventional device for converting a parallel electrical code to pneumatic signal is known which comprises a convertor for parallel-binary-code-to digital-D.C.-signal conversion and a convertor for analog-current-to-analog-pneumatic-signal conversion. A device of this kind is employed in a multiplex pneumatic system.

This device has the following disadvantages: first, a low accuracy due to the multistage conversion of input code resulting in a loss of accuracy, and second, the dropping of pneumatic signal to a minimum occurring during cut-offs in the electric power supply, which is inadmissible in automatic process control systems since it would cause all the pneumatic regulators to be reset to zero and the actuating members of the final control mechanisms to move into their extreme positions thus barring the normal course of a process.

An object of this invention is to provide a device possessing a higher accuracy than known devices, ability to store the input code signal after the latter is gone and the ability to convert input signals represented in an arbitrary form.

With these and other objects in view, the present invention involves the use, in a digital-analog convertor with a pneumatic output, of a lever with an unbalance indicator of the "nozzle-and-shutter" type and of a pneumatic amplifier encompassed by a rigid feedback loop, in which, according to the invention, the lever is supplied with calibrated weights positioned along one of its arms, the weights being operatively connected to separate drives each of which is fed with bits occurring in the columns of the parallel binary code, and according to the values of said bits the drives place the calibrated weights on the lever.

It is preferred to provide the digital-analog convertor having pneumatic output with a storage element mounted immediately near the drives and made in such a way that it will fix one of two possible positions of each weight.

The storage element for fixing the weights in one of the two possible positions can be made in the form of a movable rack with cogs having counterparts in two slots in the element of each drive which determines the positions of weights with respect to the lever.

The present invention will be best understood from the following description of specific embodiments when read in connection with the accompanying drawings in which:

FIG. 1 is a schematic diagram of a digital-analog convertor with a pneumatic output in accordance with the invention; and FIG. 2 shows a cogged section of a rack coupled with a member of a drive in FIG. 1, but turned 90° relative to FIG. 1.

The digital-analog convertor with pneumatic output provided in accordance with the invention comprises: a two-arm lever 1 (FIG. 1) with an unbalance indicator in the form of a nozzle 2 and shutter 3; calibrated weights 5, $5_1$ . . . $5_n$ positioned along said lever on one side of pivot 4, and a resilient element fashioned as a feedback bellows 6 on the other side of pivot 4; drives 7, $7_1$ . . . $7_n$ linked to the calibrated weights 5, $5_1$ . . . $5_n$; a storage element in the form of rack 8 with an individual drive 9; and an amplifying relay 10.

Either of two possible positions is insured by the rack 8 with cogs 11 (FIG. 2) the number of which equals that of the drives 7, $7_1$ . . . $7_n$. To this end, each cog 11 can enter one of slots 12 or $12^1$ of the corresponding executive member 13.

The device performs as follows.

With the zero signal on output of the convertor each of the calibrated weights 5, $5_1$ . . . $5_n$ is in its upper position above the lever 1.

A signal 14 (FIG. 1) to control the storing action goes into the storage drive 9 making its rack 8 shift.

The cogs 11 of the rack 8 leave the slots 12 of the executive members 13 of the drives 7, $7_1$ . . . $7_n$ thereby disengaging the executive members 13.

When a signal 15, $15_1$ . . . $15_n$ of the parallel binary code is fed to the inputs of the drives 7, $7_1$ . . . $7_n$, the calibrated weights 5, $5_1$ . . . $5_n$ are selectively placed on the lever 1 by the executive members 13 of the operated drives.

The moment developed by the calibrated weights 5, $5_1$ . . . $5_n$ is counterbalanced by the moment of the feedback bellows 6.

The values of the calibrated weights 5, $5_1$ . . . $5_n$ are proportional to the binary code in the ratio $2^0$; $2^1$; $2^2$ . . . $2^{n-1}$.

When the parallel binary code signal 15 corresponding to unity arrives at the drive 7, the executive member 13 thereof places the calibrated weight 5, corresponding to the code bit, upon the lever 1. This causes the shutter 3 to change its position relative to the nozzle 2, and, as a consequence, the air pressure in the line 16 of the nozzle 2 is changed.

The air pressure is amplified by the amplifying relay 10 and supplied to the feedback bellows 6 and to the output 17 of the convertor. In response to the change in air pressure, the bellows 6 develops a force proportional to the calibrated weight 5 placed on the lever 1, which brings the lever 1 to its initial position.

Placing of the weights 5, $5_1$ . . . $5_n$ can be effected in any combination according to the parallel binary code being sent.

To store a parallel binary code, the drive 9 in response to a storage control signal 14 resets the rack 8 thereby inserting the cogs of the rack 8 into the slots $12^1$ of their corresponding executive members 13.

Thus, after the signals 15, $15_1$ . . . $15_n$ of the parallel binary code are cancelled, the executive members 13 of the previously positioned weights 5, $5_1$ . . . $5_n$ will be held in working position by the cogs 11 of the rack 8 and a part of the calibrated weights 5, $5_1$ . . . $5_n$ which corresponds to the given code combination will remain on the lever 1 till a new signal arrives, while the convertor output 17 registers the pneumatic signal proportional to the preceding parallel binary code.

For a new value of the output pneumatic signal, the operation is repeated.

The digital-analog convertor with pneumatic output, according to the invention, makes it possible to obtain 3 to 4 times higher accuracy of conversion in comparison with previously known convertors.

We claim:

1. A digital-analog converter with pneumatic output comprising a lever, a pivot supporting said lever and dividing the same into two arms, an indicator including a nozzle and a shutter in operative association, the lever having a position of equilibrium on said pivot, the said shutter being mounted on one of the said arms; a pneumatic amplifier connected to the said nozzle, the said lever and pneumatic amplifier being coupled in feed-back relation, the amplifier having a pneumatic output constituting the output of the converter, weights linearly distributed along said one arm for obtaining moments thereon according to the application of said weights to said arm selectively according to a parallel binary code, and individual drives respectively connected with the said weights and each of which is controlled in accordance with a column bit of the parallel binary code, the said drives being displaceable for placing the said weights upon the said lever in accordance with the values of the said column bits, displacement of the shutter relative to the nozzle indicating deviation of the lever from equilibrium, the feed-back restoring the lever to equilibrium.

2. A digital-analog converter as claimed in claim 1 comprising storage means mounted adjacent said drives for retaining the last entered positions of the drums.

3. A digital-analog converter as claimed in claim 2, wherein said storage means includes a movable rack and cogs on said rack, there being two slots in each drive into which the cogs are selectively inserted to determine and retain the position thereof and thereby of said weights in respect of said lever.

4. A digital-analog converter as claimed in claim 1 comprising a bellows coupled to said amplifier and to the other of said arms to restore the lever to equilibrium.

References Cited

UNITED STATES PATENTS 2,659,531 11/1953 Thoresen ---------- 235—200
3,292,852 12/1966 Shinskey ---------- 235—200

RICHARD B. WILKINSON, Primary Examiner

LAWRENCE R. FRANKLIN, Assistant Examiner

U.S. Cl. X.R.

235—200